(12) United States Patent
Tyndall

(10) Patent No.: US 7,006,946 B1
(45) Date of Patent: Feb. 28, 2006

(54) MECHANICAL TRANSMISSION OF DATA TO AN ELECTRONIC DEVICE IN A TIRE

(75) Inventor: Patrick Allan Tyndall, Simpsonville, SC (US)

(73) Assignee: Michelin Recherche et Technique S.A., (CH)

( * ) Notice: Subject to any disclaimer, the term of this patent is extended or adjusted under 35 U.S.C. 154(b) by 0 days.

(21) Appl. No.: 10/932,961

(22) Filed: Sep. 2, 2004

(51) Int. Cl.
*G06F 19/00* (2006.01)

(52) U.S. Cl. ........................................ 702/182; 701/29
(58) Field of Classification Search ................ 702/182, 702/183–185; 73/579, 11.04; 701/29
See application file for complete search history.

(56) References Cited

U.S. PATENT DOCUMENTS 5,477,453 A * 12/1995 Harashima .................. 701/37

2003/0197604 A1* 10/2003 Ogawa et al. .............. 340/445

* cited by examiner

Primary Examiner—Edward Raymond
(74) Attorney, Agent, or Firm—Dority & Manning, P.A.

(57) ABSTRACT

Methodology and apparatus are disclosed for transmitting data to a tire electronics device contained in a tire. The tire electronics device includes a vibration sensor and microcontroller configured so that vibrations sensed by the vibration sensor may be analyzed to determine if the vibrations occurred according to a predetermined sequence. Detection of the predetermined sequence of vibrations may be used to trigger data transmission from the tire electronics device or may be used as an indication to the tire electronics device that it should store additional data or modify its operation in a predetermined fashion. Data may be transmitted to the tire electronics using a variety of mechanical and electromechanical devices including permanently or temporarily installed traffic lane devices or portable mechanical or electromechanical devices.

13 Claims, 3 Drawing Sheets

MECHANICAL TRANSMISSION OF DATA TO AN ELECTRONIC DEVICE IN A TIRE

FIELD OF THE INVENTION

The present subject matter concerns the transmission of data to tire electronics devices for use with vehicle tires. More particularly, the present subject matter concerns enhancements to such devices through the provision of mechanical data transmission methodologies.

BACKGROUND OF THE INVENTION

The incorporation of electronic devices with pneumatic tire and wheel structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate tire or vehicle parameters.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Radio frequency identification devices (RFID) can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,862,486 (Wing et al.) also relates to tire electronics, and more particularly discloses an exemplary revolution counter for use in conjunction with automotive and truck tires. Additional background information regarding RFID technology may be had by reference to co-pending, commonly owned U.S. patent application Ser. No. 10/697,576, filed Oct. 30, 2003, entitled "Acoustic Wave Device With Digital Data Transmission Functionality" incorporated herein for all purposes.

In conventional implementations of RFID devices in tire-related applications, such devices typically store collected and previously recorded information for delayed transmission. The stored collected data may relate to tire operating parameters such as tire pressure, tire temperature, speed, total number of revolutions, and other parameters as well as calculated data such as temperature at speed, miles at temperature, pressure variation over miles or time and other data of specific interest depending on exact usage of the RFID device. Previously recorded data may include such as a serial number or identification number for the tire with which a particular RFID device may be associated or other data such as manufacturing data including manufacturer and/or place, time and date of manufacture or other data related to the tire or RFID device per se.

Transmission of data from RFID devices may be initiated automatically or triggered manually. Manual triggering of a transmission from such an RFID device normally requires an operator to employ some form of interrogator device. Interrogator devices may be fixed or handheld devices that will typically be configured to transmit a radio frequency (RF) signal that is received by an RFID device that interprets the transmitted signal as an instruction to begin data transmission. One advantage of using an RF field-generating interrogator resides in the fact that the RF field itself may be used as a power source for the RFID device. Alternative methods for triggering data transmission are known and include such as placing a permanent magnet in proximity to a tire electronics package to operate a mechanical or electrical switch to begin data transmission or physically removing a tire from its wheel to gain access to an electrical connector associated with the tire electronics and thereby gain access to stored data.

It is sometimes the case that in radio frequency transmission systems, the specialized apparatus necessary to trigger data transmission may not be readily available when needed. Even relatively simple equipment like a permanent magnet might not be available, and other techniques for gaining access to stored data such as physically removing a tire may be impractical or impossible in the time frames that may be associated with normal vehicle movement. While various implementations of RFID devices in tire electronic systems have been developed, and while various combinations of information have been wireless relayed from tire or wheel assemblies using conventional technologies, no design has emerged that generally encompasses all of the desired characteristics as hereafter presented in accordance with the subject technology.

In accordance with the present subject matter, it is appreciated that certain advantages of piezoelectric materials have long been recognized. However, such technology is constantly improving, thus potentially affording applications that utilize piezoelectric materials with improved operating capabilities. Examples of relatively new advances in piezoelectric technology are provided in U.S. Pat. No. 5,869,189 (Hagood, IV et al.) and U.S. Pat. No. 6,048,622 (Hagood IV et al.), directed to composites for structural control. The presently disclosed technology concerns further advances in piezoelectric structure applications such that a piezoelectric power generating and sensing device can be integrated with a tire or wheel assembly for purposes of data transmission to associated RFID or other tire related data collection and storage devices. It should be appreciated, however, that although the principally discussed mechanism for data detection and transmission involves piezoelectric sensors, other types of mechanical vibration sensitive elements could also be employed. Thus the basic methodology illustrated involves the mechanical transmission of data through a tire or other housing or containment element. Moreover, the device or mechanism used for detecting the mechanical vibrations involved with such data transmission as well as the devices and methods used to produce such mechanical vibrations are secondary in nature to the basic principles disclosed.

Currently pending and co-owned U.S. patent application Ser. Nos. 10/143,535 and 10/345,040 disclose aspects of generating and harvesting electric power from a rotating tire's mechanical energy using piezoelectric materials. The present invention concerns further applications offered by the integration of such piezoelectric structures in a tire or wheel assembly. More particularly, such piezoelectric structures can be combined with additional features to provide an extremely simple and convenient methodology for manually or automatically initiating information transfer to an RFID or other device mounted in association with a tire or wheel assembly in accordance with aspects of the present invention.

The disclosures of all of the foregoing United States patents and patent applications are hereby fully incorporated into this application for all purposes by reference thereto. While various tire electronics systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for transmitting data to an RFID device or other tire electronics based device has been developed. More particularly, according to the present subject matter, an improved methodology has been developed that provides extreme simplicity in the transmission of information to tire electronics device that incorporate, at least, motion sensitive elements.

According to certain aspects of the present subject matter, methodologies are provided for the transmission of information to tire electronics devices without requiring highly specialized interrogators or other forms of electronic equipment.

In accordance with other aspects of the present subject matter, methodologies are provided wherein information may be selectively transmitted to tire electronics devices at various selected times and places by either manual initiation or automatically as a vehicle passes through a designated area or along a designated path.

According to yet other aspects of the present subject matter, methodologies are provided that permit more-or-less permanent designation of specific areas or vehicle pathways as those at which data is to be automatically transmitted to a tire electronics device.

According to yet still other aspects of the present subject matter, portable devices are disclosed that permit easy and convenient temporary designation of specific locations as locations at which data is to be transmitted to a tire electronics device.

Additional aspects of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
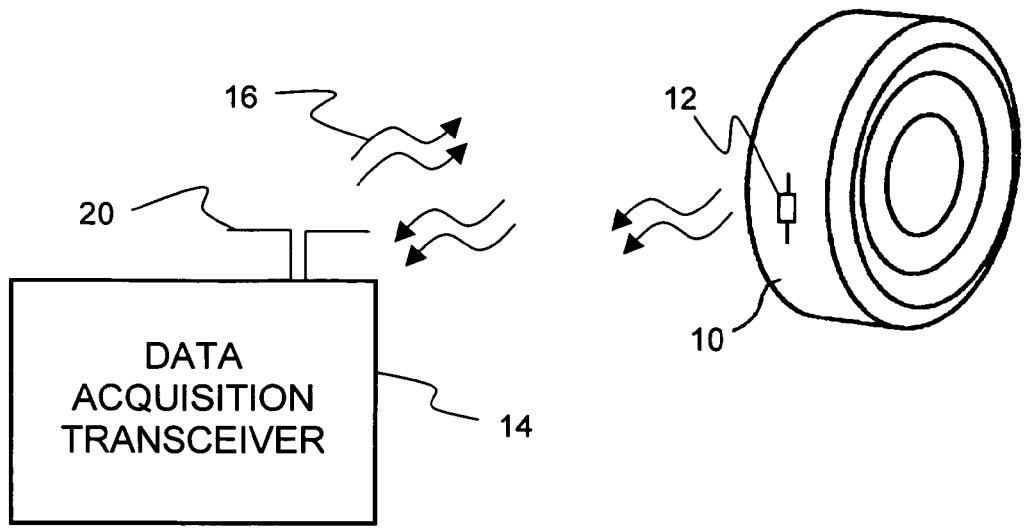
FIG. 1 illustrates a pneumatic tire incorporating a tire electronics device to which the present technology may be applied.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with methodologies for transmitting data to a tire electronics device incorporated in a tire or wheel structure of a vehicle.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar functions.

Referring now to the drawings, FIG. 1 illustrates aspects of a known tire monitoring system. Tire structure 10 may incorporate a tire electronics device 12 that may include condition-responsive sensors to monitor various physical parameters such as temperature or pressure within the tire or associated wheel assembly as well as vibration-responsive sensors to monitor vibrations induced from road related parameters or other conditions. Tire electronics device 12 may be physically attached to an inner liner of tire 10, to the sidewall of the tire, to the crown of the tire or actually embedded in the tire structure. Such a tire electronics device 12 may include at least one RFID type device capable of storing and transmitting data accumulated from the various condition-responsive devices as well as data recorded in a memory portion of the tire electronics device during original manufacture or at some other time from an external data source.

Tire electronics device 12 may derive operating power from an onboard generator, batteries that may be replaceable or rechargeable (possibly by the onboard generator) or from external sources. It should be appreciated that, in accordance with the present technology, a tire electronics device may correspond to any of the variously known types of commercially available devices that include at least a power source, a microcontroller, a memory capable of storing data and programming instructions, a data transfer mechanism and at least one sensor responsive to induced vibration. Vibration responsive sensors may include various piezoelectric devices, accelerometers, and virtually any other type of device capable of generating or producing a signal based on induced vibration. It should further be appreciated that the present subject matter does not rely on the use of any particular type sensor but rather only on the concept of the production of a vibration induced signal.

The tire electronics device 12 of FIG. 1 is typically interrogated by a data acquisition transceiver 14 that may be provided with both transmitter and receiver electronics to communicate with the tire electronics device 12. RF pulses 16 transmitted from the antenna 20 of the transceiver 14 to the electronics assembly in tire 10 may be used both to provide power to the tire electronics device 12 as well as to supply control or data signals. Such control or data signals may provide instructions to the tire electronics device 12 to either transmit its stored data or to perform some other desired task such as to store additional data or modify is operation in some predetermined manner.

Figure 2:
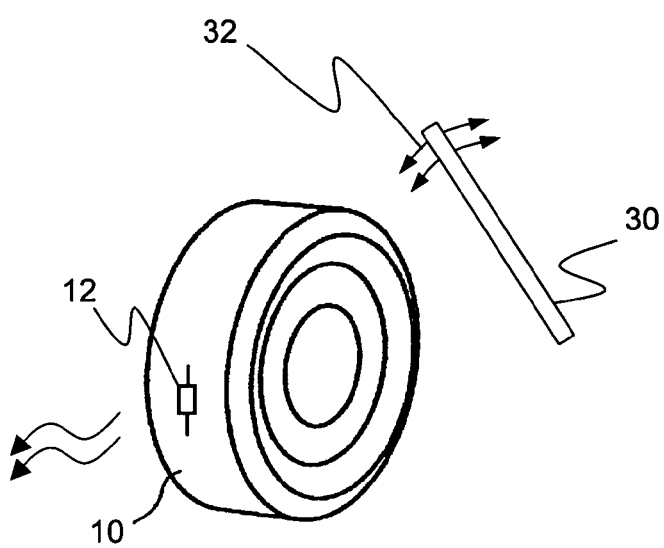
FIG. 2 illustrates an exemplary methodology for transmitting data to a tire electronics device incorporated into a pneumatic tire wherein the tire is manually struck to transmit selected data.

Reference will now be made in detail to the presently preferred embodiments of the subject electronics assemblies and methodologies for their operation. Referring now to FIG. 2, an exemplary alternative methodology for transmitting data to tire electronics device 12 contained within tire 10 in accordance with the present technology is illustrated. As previously mentioned, tire electronics 12 corresponds to a device including several functionally related portions including, among others, at least a vibration responsive sensor. The present subject matter provides methodologies for employing such a vibration responsive sensor as a data transmission element in lieu of, or in addition to, data acquisition transceiver 14 of FIG. 1 for certain of the functions normally performed by the data acquisition transceiver.

In normal operation, tire electronics device 12 is responsive to what may be considered random vibrations induced as a result of contact with a surface. Certain of these vibrations may, in fact, be cyclical in nature as, for example, resulting from tire rotation as the tire rolls along or over a surface. The present subject matter seeks to make use of the vibration sensing capability of tire electronics device 12 by providing the tire electronics device 12 with the capability to identify specific vibrational sequences and to respond to such identified sequences in predetermined manners depending on the sequences identified and thereby provide an alternate and new form of tire electronics data transmission.

As illustrated in FIG. 2, in order to take advantage of this new form of tire electronics data transmission, a baton 30 or other element may be held in an operator's hand and used to physically strike tire 10 in a predetermined sequence as suggested by arrows 32. Tire electronics device 12 may be programmed to monitor the various vibrations it is already capable of detecting to determine if it recognizes the predetermined sequence and, if so, acts in a predetermined manner depending on the sequence detected. Of course an operator may use any available item to strike the tire including his foot, giving new life to the old adage of "kick the tires" as you inspect a vehicle.

The recognition that an intentionally induced predetermined vibrational sequence may be used to communicate specific data to a tire electronics device gives rise to a number of possibilities. As a starting point, very simple data or commands could be transmitted to the tire electronics device 12 such as to query the device and trigger a radio frequency (RF) transmission from the tire electronics device 12. Other relatively simple commands might include striking a tire in a predetermined sequence immediately after the tire is mounted on a vehicle to convey to the tire electronics the tire's specific location on the vehicle.

Figure 3:
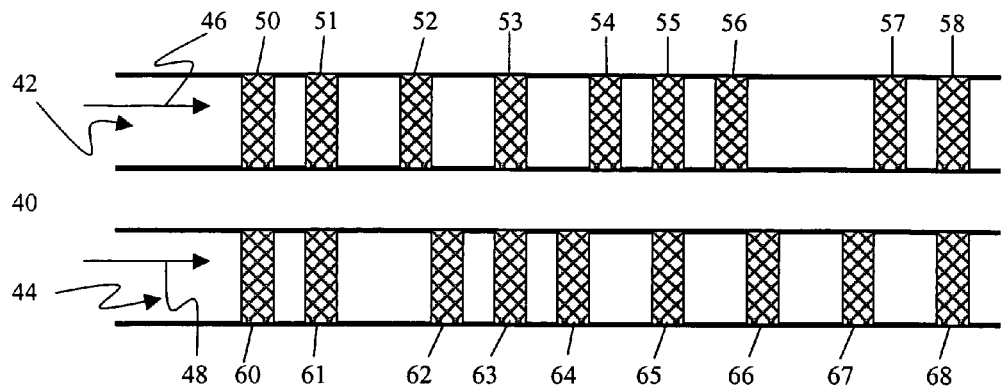
FIG. 3 illustrates a vehicle lane configured with a predetermined sequence of vibration inducing elements designed to transmit a predetermined data sequence to a tire electronics device.

With reference now to FIG. 3, a more complex form of intentionally induced vibrational communications will be described. Representatively illustrated in FIG. 3 is a vehicle travel lane 40 shown as corresponding to either two separate traffic lanes 42, 44, or, alternatively, a single travel lane 40 corresponding to two separate tracks 42, 44. In the first instance, a plurality of vehicles may pass over either of the two separate lanes 42, 44, such that all of the tires mounted on any one vehicle would be subject to the same sequence of induced vibrations resulting from passing over vibration inducing discontinuities 50–58 or 60–68. It should be noted that discontinuities 50–59 and 60–68 might comprise protrusions, recesses or combinations thereof. The function of such discontinuities is to selectively induce vibration into a tire passing over the discontinuities, and thus, it is important to the operation of the presently disclosed technology only that a vibration producing mechanism is provided without limitation as to the physical shape or structure of such vibration producing mechanism. In the second instance, the traffic lane 40 is sized such that lanes 42 and 44 respectively represent the left and right sides of a single vehicle. That is, a single vehicle traveling in the direction of arrows 46, 48 would pass over lane 40 in such manner that the left tires of the vehicle would pass over track 42 while the right tires of the vehicle would pass over track 44.

With specific reference to FIG. 3, it should be noted that the vibration inducing discontinuities 50–58 are shown as spaced differently from vibration inducing discontinuities 60–68. Such representation is intended to illustrate that it is not necessary, and, in fact may be desirable, that data transmitted to tire electronics contained in the various tires be different from one side of the vehicle to the other. Such is not to suggest, however, that this divergence in transmitted data is required as clearly the data could be the same as was illustrated with the previously described concept of a single vehicle passing through lane 42 or 44 such that all tires of the vehicle are subject to the same intentionally induced vibrations.

Numerous possibilities exist for the effective implementation of what may be described as mechanically encoded traffic lanes as illustrated in FIG. 3. Such traffic lanes could be created along any desired travel surface by installation of any material that may be secured to the travel surface. Material might include asphalt or concrete or any other known road surfacing material. In this instance, the intentionally induced vibration discontinuities might resemble conventionally used, so called, rumble strip as are often placed on the edges of roadways to alert drivers that their vehicle may be off the established travel lanes. Alternatively other materials may be used as may be convenient to any particular installation. Non-exhaustive examples include wood, plastic, metal or composite structures.

In another alternative, discontinuities 50–58 and 60–68 may comprise recesses cut into the surface of a roadway as by sawing or other means in a manner similar to providing water runoff channels in a road surface. Suitable recesses might be created in newly laid asphalt or concrete roadway surfaces by impressing a suitably configured form into the roadway surface before the surface becomes firm. Other suitable mechanism for creating discontinuities in a traffic lane will become apparent to those of ordinary skill in the art in light of the present disclosure and given the understanding that any mechanism that will produce a controlled induced vibration may be used to carry out the information transmission methodology of the present technology.

Mechanically encoded traffic lanes have utility in many different areas involving vehicular traffic. Mechanically encoded traffic lanes could be created at various locations along prescribed travel routes so that tires electronics devices associated with vehicle tires passing over such lanes would be triggered to record such information as distance, time or speed at the particular location or to trigger context-sensitive transmissions of data at a weigh station or depot. In the context of different encoding schemes for different lanes along a traveled route, different data or instructions could be passed to a tire electronics device as a vehicle enters and then leaves a particular area.

Based on the previous discussions of the range of complexity of data transmissions possible using the presently disclosed technology, it should be evident to those of ordinary skill in the art that the exact number of vibration inducing discontinuities illustrated in the various figures are exemplary only. Any number of discontinuities may be used as may be necessary to encode the data to be transmitted. Moreover various encoding schemes may be employed as desired to insure accurate transmission of data. For example, where it may be important that data is accurately transmitted and received, an encoding scheme involving a checksum or some other form of data verification may be used. Alternative methodologies might include the transmission of the same data a predetermined number of times in a technique that requires detection of the same data the predetermined number of times before it is accepted. It may also be advantageous to design bi-directional codes such that the same information is transmitted to a tire electronics device regardless of the direction a vehicle may take in passing over a mechanically encoded travel lane. All such variations are envisioned by the present subject matter.

Figure 4:
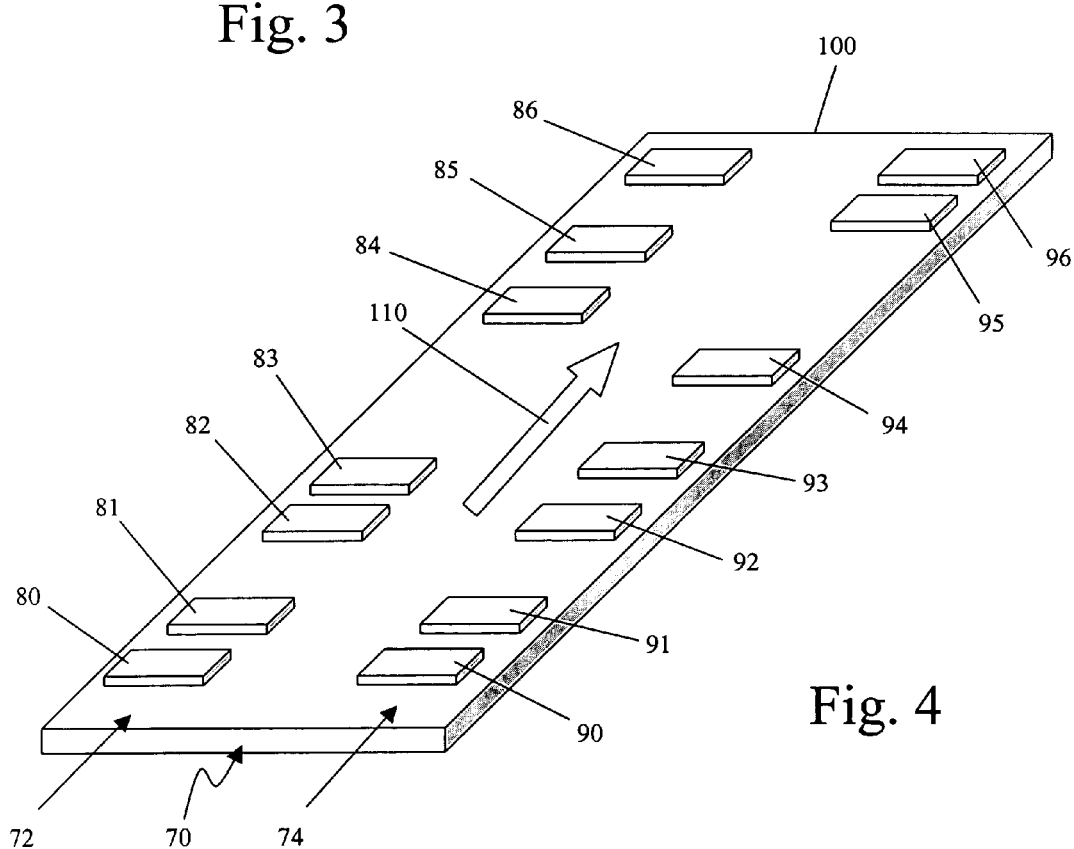
FIG. 4 illustrates an exemplary portable device that may be selectively placed at locations at which data is to be transmitted to tire electronics devices.

With reference now to FIG. 4, an exemplary representation of a portable traffic lane encoder 70 is illustrated. Portable traffic lane encoder 70, like the traffic lanes illustrated in FIG. 3 may be sized to correspond to either a pair of separate traffic lanes or to a single traffic lane accommodating two separate tracks. Portable traffic lane encoder 70 may be manufactured using any suitable materials ranging from wood to plastic to metal. For example a base 100 might be provided in the form of one or more standard sheets of plywood while intentional vibration inducing discontinuities 80–86 and 90–96 in the form of protrusions might be provided by selectively sized and positioned additional plywood portions that may be glued, nailed or otherwise affixed to the base 100 in a predetermined manner designed to correspond to a desire encoding pattern. Assembly and direction markers such as arrow 110 may be applied to base 100 to insure proper lane directionality in cases where bi-directional coding is not used.

Such a portable traffic lane encoder 70 might find utility at a temporary installation such as randomly erected vehicle inspection or weigh stations or temporary depot areas where more permanent forms of intentional vibration inducing protrusions may be destructive to the road surface or cost prohibitive to install on a temporary basis. Additionally, portable traffic lane encoder 70 may be used as the aforementioned form usable with freshly laid asphalt or concrete to produce recesses by laying the portable traffic lane encoder 70 "face down" in the still soft roadway material to produce recesses in the surface at locations corresponding to the protrusions illustrated.

Figure 5:
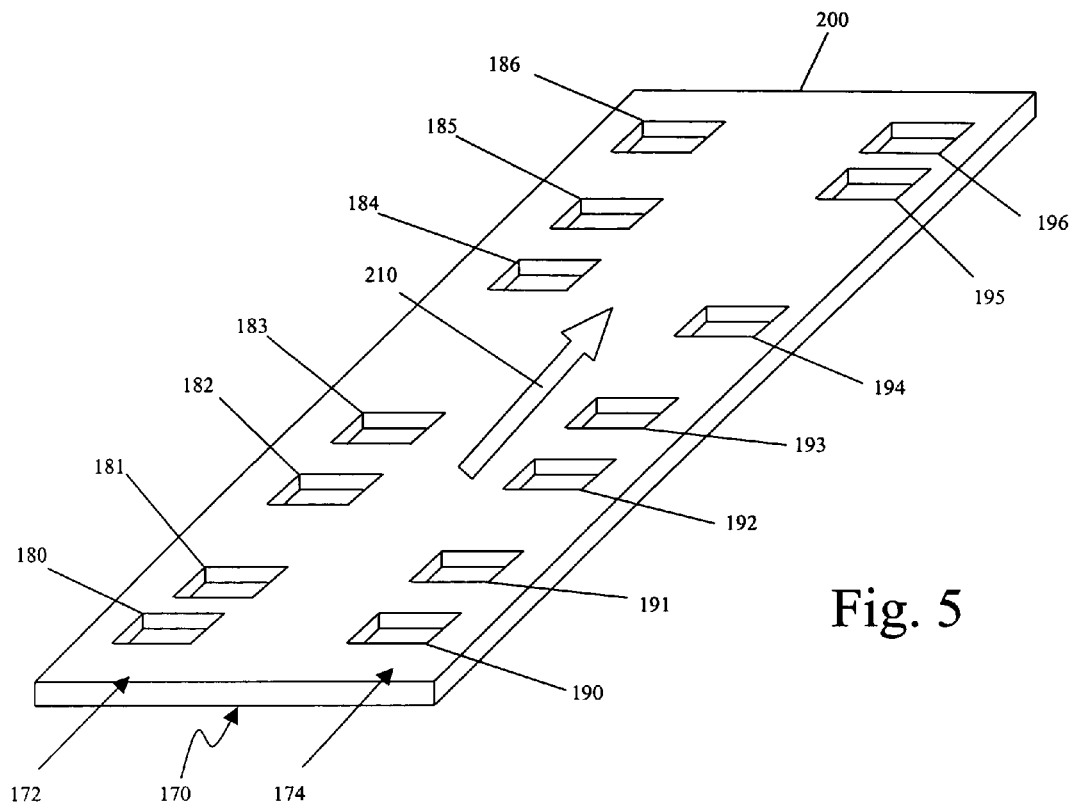
FIG. 5 illustrates another exemplary portable device that may be placed at locations at which data is to be transmitted to tire electronics.

FIG. 5 illustrates an alternative arrangement of a portable traffic lane encoder 170 corresponding in every detail, and including equivalent reference numbers incremented by 100, to that of FIG. 4 except that the illustrated protrusions of FIG. 4 are replaced by recesses that may be provided by cutting holes into the material 200 from which the portable traffic lane encoder 170 is constructed. Yet another alternative configuration may be provided by combining feature of the embodiments illustrated in FIGS. 4 and 5 by providing combinations of protrusions and recesses as discontinuities in the same traffic lane encoder. Such an alternative might be used to provide different aspects to an induce vibration signal that could result in additional encoding possibilities for the transmitted information.

Figure 6:
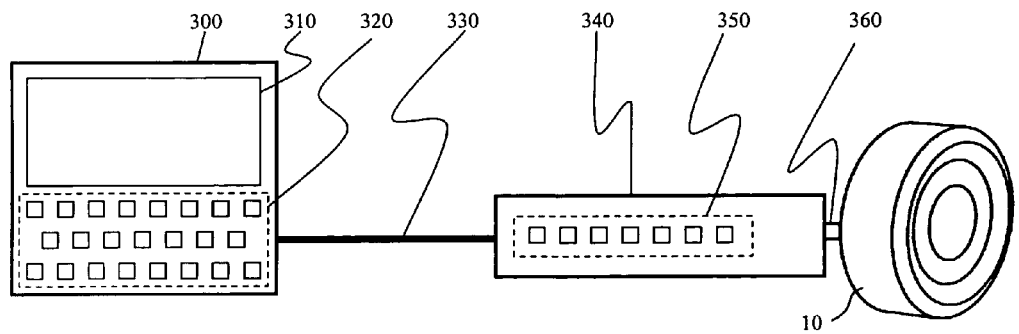
FIG. 6 diagrammatically illustrates an alternative arrangement for transmitting data to tire electronics.

Referring now to FIG. 6, an alternative induced vibration data transmission apparatus and methodology will be described. Illustrated in FIG. 6 is an induced vibration data transmission system including a controller 300 and an associated vibration-inducing device 340 coupled together, at least temporarily, by a coupling cable 330 or other signal transmitting mechanism. Although illustrated in FIG. 6 as separate elements it should be clearly understood that the vibration inducing system might optionally take the form of a unitary, self-contained, device and might even be embodied as a fixture mounted on a floor plate that a tire is driven onto or placed on for data transmission.

Controller 300 may optionally include a display portion 310 and a data entry or control portion 320. Non-exhaustive examples suitable for use as controller 300 include desktop computers, laptop computers, dedicated preprogrammed controllers, personal digital assistants (PDAs) and any other device capable of providing program and or control data or signals to a vibration producing element or device. Optional display device 310 may comprise a liquid crystal display (LCD), a cathode ray tube (CRT), a sequence of illuminated indicators including lamps or light emitting diodes (LEDs) or any other type of device that may give operational indications or visual signals to an individual operating the controller 300. Data entry or control portion 320 may optionally include a keypad or a specialized series of control buttons or keys or, might constitute a portion of the display device 310 by taking the form of a touch panel.

Vibration inducing device 340 may optionally include its own data entry or control portion 350 that, like controller 300 may take the form of a touch sensitive display panel or may comprise a series of control buttons or keys and an optional separate display panel or other visual indicator elements. Vibration inducing device 340 is provided with a vibration inducing transducer 360 that may be placed in contact with tire 10 to transmit the vibrational energy through the tire and to the contained electronics. Nonexhaustive examples of vibration inducing transducers including piezoelectric transducers, acoustic transducers and inductive devices. In general any device capable of converting electrical signals into a mechanical vibration may be employed.

Of course those of ordinary skill in the art should appreciate that such electromechanical systems are not exclusively capable of producing the controlled vibrational sequences required for practicing the present disclosure. In fact any mechanism, electrical, mechanical, or otherwise, capable of producing a controlled sequence of vibrations may be employed with the present technology.

In the present example, the vibration producing device 340 and contained vibration producing element 360 may be temporarily coupled by cable 330 to a controller 300 by way of suitable connectors for programming of a memory device contained in vibration producing device 340. In such a configuration, selected data from controller 300 may be passed to vibration producing device 340 and stored in a memory portion of the device. Subsequently the vibration producing device 340 may be disconnected from the controller 300 and transported to a remote location for use. Alternatively, the controller 300 and vibration producing device may remain connected and the controller 300 may control the vibration producing device 340 directly while connected to the controller without the need to first store data in any internal memory. As previously noted, of course, the controller 300 and vibration producing device 340 may be combined into a single, integral unit with no connecting cable required.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of transmitting data to a tire electronics device, comprising the steps of:
    providing a tire;
    providing a tire electronics device, the tire electronics device comprising a microcontroller portion, a memory portion, and a vibration sensor portion, the vibration sensor portion producing signals proportional to sensed vibration;
    associating the tire electronics device with the tire such that vibration sensor portion of the tire electronics is responsive to vibration induced in the tire;
    configuring the microcontroller portion of the tire electronics to monitor signals produced by the vibration sensor portion and to identify one or more predetermined signal sequences; and
    inducing vibrations into the tire corresponding to one or more of the predetermined signal sequences.

2. The method of claim 1, wherein the step of inducing vibrations into the tire comprises manually striking the tire.

3. The method of claim 1, wherein the step of inducing vibrations into the tire comprises the steps of:
    designating a predetermined traffic lane over which vehicular traffic may pass;
    providing a plurality of selectively spaced protrusions at predetermined locations along the predetermined traffic lane; and
    passing the tires and associated tire electronics devices over the plurality of selectively spaced protrusions.

4. The method of claim 3, wherein the step of providing a plurality of selectively spaced protrusions comprises selectively affixing predetermined quantities of material at predetermined locations along the predetermined traffic lane, whereby tires associated with vehicles passing through the predetermined traffic lane will be subject to induced vibrations at the predetermined locations.

5. The method of claim 3, wherein the step of providing a plurality of selectively spaced protrusions comprises the steps of:
    providing a base surface;
    affixing a plurality of protrusion forming elements to selected predetermined portions of the base surface; and
    placing the base surface with affixed elements within the predetermined traffic lane.

6. A tire electronics device comprising:
    a microcontroller portion having an input portion;
    a program memory portion coupled to the microcontroller portion; and
    a vibration sensor portion coupled to the input portion of the microcontroller portion capable of producing signals representative of sensed vibration,
    wherein the program memory portion is configured to provide program instructions to the microcontroller portion to enable the microcontroller portion to monitor, evaluate and identify signals produced by the vibration sensor portion corresponding to one or more predetermined signal sequences.

7. The tire electronics device of claim 6, further comprising:
    a data memory portion; and
    a data transmission portion,
    wherein the program memory portion is further configured to provide instructions to the microcontroller portion to enable the microcontroller portion to cause the data transmission portion to transmit selected data stored in the data memory portion upon identification of one or more predetermined signal sequences.

8. The tire electronics device of claim 7, wherein the data transmission portion comprises a radio frequency transmission device.

9. The tire electronics device of claim 6, further comprising:
    a data memory portion,
    wherein the program memory portion is further configured to provide instructions to the microcontroller portion to enable the microcontroller portion to cause the data memory portion to store selected data in the data memory portion upon identification of one or more predetermined signal sequences.

10. A tire and tire electronics device combination comprising:
    a tire; and
    a tire electronics device associated with said tire, said tire electronics device comprising:
        a microcontroller portion having an input portion;
        a program memory portion coupled to the microcontroller portion; and
        a vibration sensor portion coupled to the input portion of the microcontroller portion capable of producing signals representative of sensed vibration, wherein the program memory portion is configured to provide program instructions to the microcontroller portion to enable the microcontroller portion to monitor, evaluate and identify signals produced by the vibration sensor portion corresponding to one or more predetermined signal sequences produced from vibrations induced in the tire.

11. The tire and tire electronics device combination of claim 10, further comprising:
 a data memory portion; and
 a data transmission portion,
  wherein the program memory portion is further configured to provide instructions to the microcontroller portion to enable the microcontroller portion to cause the data transmission portion to transmit selected data stored in the data memory portion upon identification of one or more predetermined signal sequences.

12. The tire and tire electronics device combination of claim 10, further comprising:
 a data memory portion,
  wherein the program memory portion is further configured to provide instructions to the microcontroller portion to enable the microcontroller portion to cause the data memory portion to store selected data in the data memory portion upon identification of one or more predetermined signal sequences.

13. The tire and tire electronics device combination of claim 12, wherein the data transmission portion comprises a radio frequency transmission device.

* * * * *